No. 625,285. Patented May 16, 1899.
VAN BURTON WILLITS.
VEHICLE WHEEL BRAKE.
(Application filed Sept. 24, 1897.)
(No Model.)
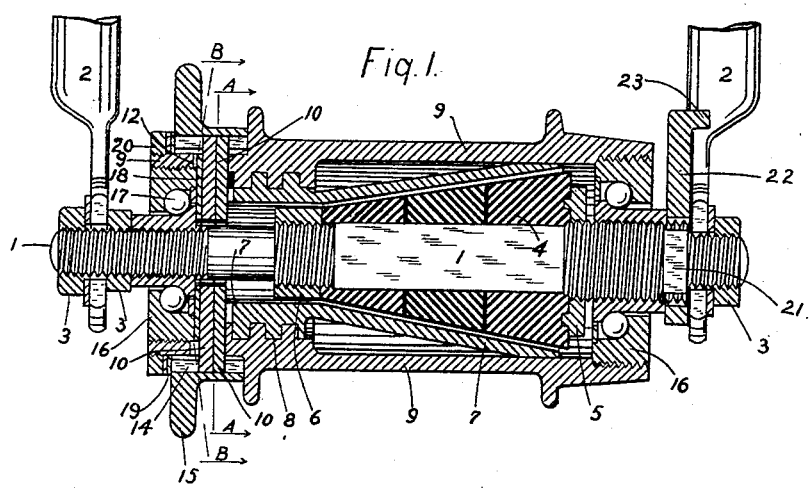
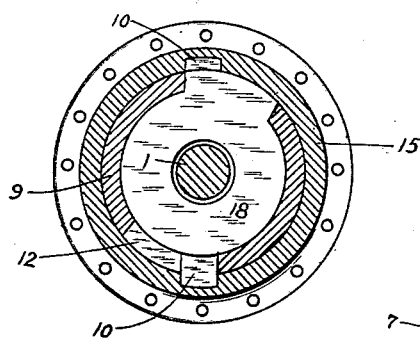
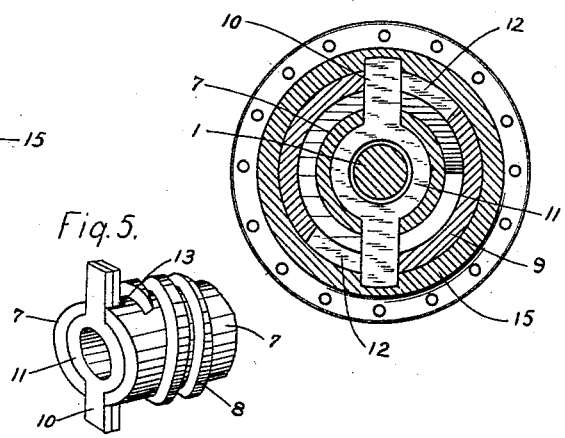
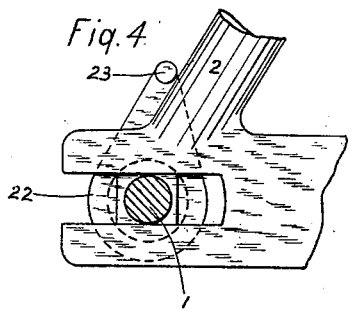
Witnesses
R. D. Hawkins.
Zula Green.
Inventor
Van Burton Willits
By V. H. Lockwood
Attorney.

UNITED STATES PATENT OFFICE.

VAN BURTON WILLITS, OF INDIANAPOLIS, INDIANA, ASSIGNOR TO THE HAY & WILLITS MANUFACTURING COMPANY, OF SAME PLACE.

VEHICLE-WHEEL BRAKE.

SPECIFICATION forming part of Letters Patent No. 625,285, dated May 16, 1899.

Application filed September 24, 1897. Serial No. 652,928. (No model.)

*To all whom it may concern:*

Be it known that I, VAN BURTON WILLITS, of Indianapolis, county of Marion, and State of Indiana, have invented a certain new and useful Vehicle-Wheel Brake; and I do hereby declare that the following is a full, clear, and exact description thereof, reference being had to the accompanying drawings, in which like numerals refer to like parts.

This invention relates to a brake mechanism located within the hub of the bicycle or other vehicle-wheel and is of the same general character as that set forth in a prior application by me, filed July 12, 1897, Serial No. 644,352.

One feature of my invention consists in providing a lug-washer between the bearing-cup on the one side and the dogs and friction-sleeve on the other side. This is used to protect the cup from the operation of the friction-sleeve and the reverse and also to hold the dogs in place and prevent them from unscrewing the cup.

Another feature of this invention consists in dispensing with the threaded nut shown in my former application to actuate the conical sleeve and instead thereof threading the end of the friction-sleeve and the interior of the hub, so they will be engaged and the rotation of the sleeve will cause its lateral movement relative to the hub. This also dispenses with the longitudinal recesses in the interior of the hub, in which the lugs on the larger end of the friction-sleeve operate in the device shown in my former application, because this friction-sleeve must rotate in the device herein shown.

Another feature of this invention consists in means for resisting the torsional strain brought by the brake mechanism on the axle. This is accomplished by an arm fitting around a flattened portion of the axle and engaging one of the rear braces of the bicycle-frame to prevent absolutely any rotation of the axle.

The full nature of this construction and invention will be understood from the accompanying drawings and the description and claims following.

Figure 1 is a central longitudinal section of the bicycle-hub provided with my brake mechanism. Fig. 2 is a cross-section on the line A A of Fig. 1. Fig. 3 is a cross-section on the line B B of Fig. 1. Fig. 4 is an end elevation of the left-hand end of the device as shown in Fig. 1, the axle being in section just outside the rear brace. Fig. 5 is a perspective of the threaded end of the conical sleeve and the dogs in place.

In detail, 1 is an axle of a bicycle, mounted in the rear braces 2, which are held in place on the axle by the nuts 3. The axle is squared in its central portion and threaded at each end. On the squared portion of the axle I slip a friction-cone 4, made preferably in sections, three being shown, of vulcanized fiber. Each section is centrally apertured to fit snugly on the squared portion of the axle, and the sections are secured together by some suitable cement. However, it is not necessary that the sections should be secured together. This construction of the friction-cone permits the whole of it to be formed of thoroughly-seasoned vulcanized fiber, as the thickness of the sections need be no greater than the thickness of the strips of material as usually sold and which permits it to be seasoned well all the way through from side to side. Because of the great strain brought on the friction-cone it is necessary that the material be well seasoned. The cone is held from lateral movement on the axle by the nuts 5 and 6. The former has inwardly-projecting annular flanges that fit into a corresponding recess in the friction-cone, thus locking the two together. The friction of the friction-cone on the axle can by this means be adjusted; but during the operation of the brake the cone must be fixed securely on the axle from either rotary or lateral movement. To engage with said friction-cone, and thus retard the motion of the vehicle, I provide a friction-sleeve 7, the major portion of which is conical concentric with the friction-cone; but at its smaller end it is provided with coarse threads 8, that mesh with corresponding threads in the interior of the hub 9. The larger end of the sleeve is ground off to make a close smooth joint with the interior surface of the hub in order that the sleeve may be well centered. It is obvious that when the sleeve 7 is rotated in one direction it will be moved laterally toward and into engagement with the friction-cone and that when it is rotated in the opposite direction it will be moved laterally away from the cone into the position shown in Fig. 1. The extent of the lateral movement of the sleeve to effect a complete retardation of the movement by frictional contact with the friction-cone is very slight when the cone is adjusted to the proper position.

The sleeve 7 is rotated by means of the two sets of dogs 10, each of which consists of a pair, in the drawings shown oppositely placed and connected by a ring 11, as seen in Fig. 2. The dogs extend through oppositely-placed slots 12 in the hub. Two dogs are used in order that they may be inserted into such slots, for the slots are somewhat removed from the end of the hub. This can be done because the ring 11 has a smaller external diameter than the internal diameter of the hub; but it is necessary that the dogs be thin and double in order to get them in. The small or threaded end of the sleeve 7 has oppositely-placed recesses 13, through which said dogs extend, and the outer ends of said dogs extend into grooves 14 in the internal surface of the sprocket-wheel 15. This sprocket-wheel is loosely mounted on the hub, so as to rotate thereon. The dogs 10, it is observed, extend through the recess 13 in the end of the sleeve 7, through the apertures 12 in the hub, and into the recesses 14 in the sprocket-wheel. The apertures 12 in the hub, however, have a length greater than the width of the dogs, so that said dogs have a limited movement in relation to the hub; but said dogs fit snugly in the recesses in the sleeve and in the sprocket-wheel. From this description it is obvious that by rotating the sprocket-wheel in one direction or the other the conical sleeve 7 will be actuated one way or the other by means of the dogs; but with such rotary movement will be limited by the walls of the slots or apertures 12 in the hub. In view of the fact that the axle and friction-cone are stationary and connected with the frame of the vehicle and the hub and friction-sleeve are rotary, being connected with the wheel, when the friction cone and sleeve are locked together by frictional contact the wheel will be stopped from further rotation or its rotation be retarded somewhat. Thus the brake is actuated from the pedals of the bicycle; but if the back-pedaling be easy and slow the frictional contact of the sleeve and cone will be such as to retard rotation of the wheel without stopping it. This has been explained fully in my former application.

The hub of the wheel is provided with suitable ball-bearings, to be seen in the drawings. 16 is the cup, and 17 the balls thereof. Between the cup 16 and the washers and end of the conical sleeve 17 I place the lug-washer 18. It consists of a ring with the lug on one side, the lug extending into the slot 12 in the hub. The length of the lug is the same as the length of the slot. By this means the washer protects the parts to which it is adjacent and prevents the dogs unscrewing the cup. On the hub I mount a washer 19, that is pressed against the sprocket-wheel by the nut 20.

Near one end of the axle I flatten it on two opposite sides, as seen at 21 on the left-hand end of Fig. 1. Over this I slip an arm 22, that has an aperture whose width is less than its length and adapted to fit snugly over such flattened portion of the axle. The upper end of such arm has an outwardly-extending finger 23, that engages the rear surface of one of the rear braces 2. By this means when the torsional strain comes upon the axle by reason of the operation of the brake mechanism any rotary movement of the axle will be prevented, and the strain will be taken off of the forks of the rear braces because of the greater leverage of the arm 22.

What I claim as my invention, and desire to secure by Letters Patent, is—

1. In a vehicle-wheel brake, an axle, a friction-cone secured thereto, a conical sleeve concentric with the friction-cone and a portion of it externally threaded, the wheel-hub having internal threads to engage the threads on such sleeve, and means for rotating such sleeve, whereby it will be caused to move laterally into or out of engagement with the friction-cone.

2. In a vehicle-wheel brake, an axle, a friction-cone secured thereto, the wheel-hub having internal threads, a conical sleeve fitting in the hub concentric with the friction-cone and having a portion externally threaded to engage the threads in the hub, a sprocket-wheel loosely mounted on the hub, and a dog connecting the sprocket-wheel and conical sleeve, whereby the movement of the sprocket-wheel on the hub will rotate the sleeve.

3. In a vehicle-wheel brake, an axle, a friction-cone secured thereto, a hub having internal threads and radial slots near one end, a conical sleeve with the external diameter of the large end equal to the internal diameter of the hub and with its small end threaded externally to engage the threads of the hub and also recessed at the end, a sprocket-wheel mounted loosely on the hub over the slots therein and provided with an internal recess or groove, and a dog extending through and fitting in the recess or groove in said sleeve and in the sprocket-wheel and extending through the slot in the hub, such slot being long enough to permit a limited movement of the dog, substantially as set forth.

4. In a vehicle-wheel brake, a hub with a radial slot near one end, a sprocket-wheel loosely mounted thereon, a brake mechanism actuated within the hub, a dog connecting the sprocket-wheel and brake mechanism whereby the former will rotate with the latter and extending through the slot in the hub, a suitable bearing for the axle in the hub, and a washer interposed between the bearing and dog and having a lug thereon that fits snugly in the slot in the hub.

5. In a bicycle brake mechanism, the combination with the rear brace of the frame, and the axle carried in said brace flattened on one or more sides near said brace, a hub, a brake member mounted on the axle, and another on the hub to engage therewith, of an arm apertured to fit on the flattened portion of said axle so as not to turn thereon, and having an extension or finger that engages said rear brace.

In witness whereof I have hereunto set my hand this 14th day of September, 1897.

VAN BURTON WILLITS.

Witnesses:
ZULA GREEN,
V. H. LOCKWOOD.